United States Patent [19]

Elyamani et al.

[11] Patent Number: 5,285,518

[45] Date of Patent: Feb. 8, 1994

[54] FLUORIDE GLASSES AND METHODS FOR MAKING OPTICAL FIBERS FROM THE GLASSES

[75] Inventors: Abdessamad Elyamani, Eatontown; Robert Pafchek, Piscataway, both of N.J.

[73] Assignee: Rutgers University, New Brunswick, N.J.

[21] Appl. No.: 850,747

[22] Filed: Mar. 13, 1992

[51] Int. Cl.$^5$ ............................................... G02B 6/00
[52] U.S. Cl. ..................................... 385/142; 501/37; 501/40; 501/904
[58] Field of Search ..................... 65/2, 3, 11, 4.1, 4.2; 385/141, 42; 501/37, 40, 904

[56] References Cited

U.S. PATENT DOCUMENTS

| | | | |
|---|---|---|---|
| 4,341,873 | 7/1982 | Robinson et al. | 501/40 |
| 4,343,638 | 8/1982 | Mitachi et al. | 65/2 |
| 4,445,755 | 5/1984 | Ohsawa et al. | 385/142 |
| 4,659,355 | 4/1987 | Maze et al. | 65/3.12 |
| 4,661,413 | 4/1987 | Maze et al. | 428/432 |
| 4,674,835 | 6/1987 | Mimura et al. | 350/96.34 |
| 4,711,652 | 12/1987 | Roba et al. | 65/18.2 |
| 4,717,691 | 1/1988 | Lucas et al. | 501/40 |
| 4,733,940 | 3/1988 | Broer et al. | 385/142 |
| 4,749,666 | 6/1988 | Lucas et al. | 501/40 |
| 4,756,599 | 7/1988 | Manda et al. | 350/96.29 |
| 4,787,709 | 11/1988 | Kawada et al. | 350/96.34 |
| 4,872,894 | 10/1989 | Hutta | 65/3.11 |

FOREIGN PATENT DOCUMENTS 0036373 3/1980 European Pat. Off.
1587157 6/1977 United Kingdom.

OTHER PUBLICATIONS

Danh C. Tran, George H. Sigel, Jr., and Bernard Bendow, "Heavy Metal Fluoride Glasses and Fibers: A Review", Journal of Lightwave Technology, vol. LT-2, No. 5, Oct. 1984, pp. 566-586.

Y. Ohishi, et al., "Fabrication of Fluoride Glass Single-Mode Fibers," Journal of Lightwave Technology, vol. LT-2, No. 5, Oct. 1984, pp. 593-596.

"Advanced Rod-in-tube Techniques For Fluoride Fiber Fabrication," presented in 93rd Annual Meeting of the American Ceramics Society, Cincinnati, Ohio (Apr. 28-May 2, 1991).

Tran et al., "Fluoride Glass Performs Prepared by a Rotational Casting Process," Electronics Letters, 23rd vol. 18, No. 15, Ju. 1982.

S. Mitachi, et al., "Preparation of Fluoride Optical Fibers For Transmission in the Mid-infrared," Physics and Chemistry of Glasses, vol. 23, No. 6, Dec. 1982.

*Primary Examiner*—Frank Gonzalez
*Assistant Examiner*—John Ngo
*Attorney, Agent, or Firm*—Pater K. Trzyna

[57] ABSTRACT

An optical fiber having a core with a composition consisting essentially of 48 to 60 mole percent $ZrF_4$, 15 to 25 mole percent $BaF_2$, 1 to 5 mole percent $LaF_3$, 1 to 5 mole percent $AlF_3$, 15 to 22 mole percent NaF, and 1 to 8 mole percent $ThF_4$; and a cladding having an index of refraction lower than that of the core. The glass of the core can be doped, for example, with rare earths. Built-in casting, rotational casting, casting around a rod, and rod-in-tube methods can be used to produce optical fibers having a composition in accordance with the present invention and having improved resistance to crystallization, as compared to ZBLAN glasses, even in the presence of rare earth dopants.

16 Claims, No Drawings

FLUORIDE GLASSES AND METHODS FOR MAKING OPTICAL FIBERS FROM THE GLASSES

BACKGROUND OF THE INVENTION

1. Field of Invention

The present invention relates primarily to optics, optics systems and generators, and more particularly to optical conductors characterized by the composition of the material. This invention also relates to coherent light generators and amorphous (e.g. glass) optical fibers. More specifically, the present invention includes an improvement to the ZBLAN glass system involving the incorporation of thorium fluoride as a stabilizer against devitrification permitting increased concentrations of rare earth dopants, in making optical fibers.

2. Description of the Related Art

Heavy metal halide glasses offer a variety of significant advantages over silicate glass systems. Theoretically, fluoride glasses can have intrinsic absorption losses that are two to three times lower than those of silica. These lower losses make fluoride glasses ideal candidates for telecommunication uses. In addition, these glasses are transparent out to wavelengths of six or seven microns, allowing them to be used in the mid-infra red region of the spectrum for sensing applications and power delivery. The low energy phonon spectra also yield relatively high quantum efficiencies for many rare earth transitions that are quenched in silica glasses. When formulated with a sufficient amount of rare earth ions, these glasses could be attractive hosts for active fibers. A survey of the development of heavy metal fluoride glasses, their properties, and their uses is set forth by Martin G. Drexhage in Chapter 4 of the *Treatise of Materials Science and Technology*, Vol. 26 (1985), pp. 151-243.

Among the more potentially useful of the heavy metal halide glasses is the ZBLAN, which consists essentially of the fluorides of zirconium, barium, lanthanum, aluminum, and sodium. U.S. Pat. No. 4,674,835, *Fluoride Glass Optical Fiber* ("MIMURA") (assigned to Kohusai Denshin Denwa Co., Ltd.), filed Aug. 14, 1985, offers a representative formulation of ZBLAN (in mole percent):

$$50 \leq ZrF_4 \leq 55$$

$$16 \leq BaF_2 \leq 24$$

$$16 \leq NaF \leq 24$$

$$3 \leq LaF_3 \leq 5$$

$$2 \leq AlF_3 \leq 4$$

provided that $ZrF_4 + BaF_2 + NaF + LaF_3 + AlF_3 = 100$. (Col. 3, lines 27-30.)

Unfortunately, heavy metal fluoride glasses also exhibit certain undesirable properties which, until now, have limited their applications. Heavy metal fluoride glasses have poor resistance to crystallization devitrification, and MIMURA mentions the crystallization problems of ZBLAN and the scattering problems that result therefrom.

The poor resistance to devitrification also creates problem in making large preforms. Crystallization at the interface between the core and cladding during the manufacture of a preform causes problems in the most commonly used methods for making a ZBLAN optical fiber. (See, for example, Danh C. Tran, George H. Sigel, Jr., and Bernard Bendow. "Heavy Metal Fluoride Glasses and Fibers: A Review," *Journal of Lightwave Technology*, Vol. LT-2, No. 5, October 1984, pp. 566-586. See also, Y. Ohishi, et al., "Fabrication of Fluoride Glass Single-Mode Fibers," *Journal of Lightwave Technology*, Vol. LT2, No. 5, October 1984, and "Advanced Rod-in-Tube Techniques for Fluoride Fiber Fabrication," presented at the 93rd Annual Meeting of the American Ceramic Society, a symposium on optical materials, held in Cincinnati, Ohio (April 28-May 2, 1991); Tran, et al., "Fluoride Glass Preforms Prepared by a Rotational Casting Process," *Electronics Letters*, 23nd Vol. 18, No. 15, July 1982; and S. Mitachi, et al., "Preparation of Fluoride Optical Fibers for Transmission in the Mid-infrared," *Physics and Chemistry of Glasses*, Vol. 23, No. 6, December 1982.) That is, heavy metal halide glasses are prone to inhomogeneous nucleation, consequentially resulting in crystallization at the core and cladding interfaces, particularly during the drawing of a optical fiber. Resulting fibers tend to have serious scattering loss due to the crystals in the fiber.

The problem of crystallization is aggravated when the necessary ions to give the core and cladding different indexes of refraction are added to the glasses. Additional doping, for example with rare earth ions, also tends to reduce the stability of the glass.

Prior to the invention described herein, a satisfactory solution to the problem of poor resistance to devitrification in ZBLAN glass systems has not been discovered.

SUMMARY OF THE INVENTION

Surprisingly, it has been discovered that the addition of Thorium to ZBLAN glasses greatly reduces devitrification and increases chemically stability, thereby permitting an increased concentration of such dopants as rare earths. The discovery is considered surprising because it is opposite to what might be expected from some discussions in the prior art. For example, U.S. Pat. No. 4,343,638, *Method for Manufacturing Glass Fibers from an Infrared Ray-transmitting Glass Fiber Material* ("MITACHI"), (assigned to Nippon Telegraph & Telephone Public Corporation) filed Jan. 21, 1981, mentions at Col. 1, lines 29-33:

A $ZrF_4$—$BaF_2$—$LnF_3$-based glass material and $Zr_4$—$BaF_2$—$LnF_3$ (Ln stands for rare-earth fluoride)-based glass material, as well as $ZrF_4$—$BaF_2$—$ThF_4$-based and $ZrF_4$—$BaF_2$—$UF_4$-based material as disclosed in U.S. Pat. No. 4,141,741, are known as optical glass other than the $BeF_2$-based and $ZnCl_2$-based material. In the halide glass of U.S. Pat. No. 4,141,741, a practical problem arises due to the presence of a radioactive element such as Th and U. The same thing can be true of the above-mentioned other fluoride-based glass. In this case, however, these glasses are unstable against crystallization in the glass fiber drawing process and no homogeneous fiber without crystalline structure in the fiber can be obtained . . . .

(emphasis added.) From this language in MITACHI, one might not expect that Th would be useful in reducing devitrification in ZBLAN glass systems.

The discovery is also considered surprising because of the degree of increased stability. Hruby ("Hr") factor, which correlates glass stability with characteristic temperatures for a range of glass compositions, is defined by the equation $Hr = (Tc - Tg)/(Tm - Tc)$, with "Tg" referring to the glass transition temperature, "Tc" and "Tp" referring respectively to the temperatures at the onset of crystallization and at the apex of the crystallization peak of the Differential Scanning Colorimetry (See, D. R. Uhlman, A Kinetic Treatment of Glass Formation, 7 J. Non-Crystalline Solids 337 (1972); and D. Clausse and F. Brotto, Influence of a Precooling on the Nucleation Kinetics of Ice from Water Droplets, 260 Colloid Polymer Scientific Letters 641 (1982)) and Tm referring to the temperature at the apex of the melting peak. A large value for Hr implies a more stable glass.

Consider, for example, the following five compositions made according to the formula $(53-\#)\%$ $ZrF_4 + 20\%$ $BaF_2 + 4\%$ $LaF_3 + 3\%$ $AlF_3 + 20\%$ $NaF + \#\% ThF_4 = 100\%$. (Note that all formulae herein are in mole percent.) This formula is abbreviated in Table 1 below as ZBLAN#, with #=0, 1, 2, 3, 4, and 5 in mole percent of Th.

TABLE 1

| ZBLANTh# | Tg | Tc | Tp | Tm | Hr |
|---|---|---|---|---|---|
| ZBLAN0 | 262 | 358 | 381 | 469 | 0.86 |
| ZBLAN1 | 264 | 364 | 400 | 475 | 0.90 |
| ZBLAN2 | 267 | 372 | 401 | 472 | 1.05 |
| ZBLAN3 | 271 | 378 | 405 | 457 | 1.35 |
| ZBLAN4 | 275 | 384 | 414 | 459 | 1.45 |
| ZBLAN5 | 278 | 389 | 424 | 460 | 1.56 |

As shown in Table 1, ZBLAN5 has a Hruby factor value that is about twice as high as that for ZBLAN.

Accordingly, it is an object of the present invention to provide a glass system with improved stability against crystallization.

It is another object of the present invention to provide a glass system suitable for making optical fibers having less scattering than ZBLAN fibers.

It is yet another object of the present invention to provide a glass system in which an optical fiber can be manufactured with dopants necessary to create a difference in the refractive indexes of the core and cladding of an optical fiber, but without significantly reducing the stability of the glass against crystallization.

Yet another object of the present invention is to provide a glass system in which an optical fiber can be manufactured with increased amounts of rare earth dopants, but without significantly reducing the stability of the glass against crystallization. The resulting lower energy phonon spectrum permits significant excited state populations of rare earth energy levels that are quenched in silica, thereby facilitating new laser transitions.

Still another object of the present invention is to provide a glass system having a Hruby factor of at least 1.0, and preferably greater than 1.5.

Still another other object of the present invention is to provide a glass system suitable for forming large bulk samples without significant crystallization, samples which can be drawn into longer lengths of optical fibers.

The glass system of the present invention facilitates making optical fibers that can be used in laser applications, including telecommunications, the transmission of optical power, or infra-red laser windows. The glass system can also be used for making planar and other waveguides or in making glass in bulk form (e.g., for windows, lenses, preforms, etc.).

DETAILED DESCRIPTION OF A PREFERRED EMBODIMENT OF THE INVENTION

The present invention can be generally understood as an optical fiber core made of ZBLANTh—the addition of thorium to ZBLAN—preferably with at least one dopant. More particularly, the invention can be viewed as an optical glass fiber having a glass core comprised of the fluorides of zirconium, barium, lanthanum, aluminum, sodium, and thorium having a Hruby factor of at least 0.9, preferably at least 1.0, and more preferably at least 1.4, and still better, at least 1.5.

Still more particularly, the invention can be viewed as an optical fiber comprising: a core having a composition comprising:

48 to 60 mole percent $ZrF_4$;
15 to 25 mole percent $BaF_2$;
1 to 5 mole percent $LaF_3$;
1 to 5 mole percent $AlF_3$;
15 to 22 mole percent NaF; and
X mole percent $ThF_4$, wherein $X>0$; and
a cladding having an index of refraction lower than that of the core.

The amount X of $ThF_4$ should be within the range of $1<X<10$, and even more preferably, within the range of $4<X<5$ with 48 to 49% mole percent $ZrF_4$.

For an optical fiber, the core must have a higher refractive index than that of the cladding. This can be accomplished by slight changes in the composition of the core, the cladding, or both. Thus, in the above-mentioned glass formulations of the present invention, at least one constituent can be added. One way to articulate the amount and kind of constituent is that the constituent has Y mole percent of the first constituent + Z mole percent of rare earth dopant, wherein the total amount of these elements satisfies the following three conditions: $0 \leq Y$, $0 \leq Z$, and $Y + Z > 0$.

The first additive preferably is one or more of the following: Hf, Pb, or Cl; however, the first additive can be any element which, when added, is effective to change the index of refraction. If Pb is used as the first additive, preferably the composition is as defined above, except that there is 15 to 25 mole percent of the combination of $BaF_2$ and Pb, instead of the 15 to 25 mole percent $BaF_2$. Similarly, if Hf is used, preferably the composition has 48 to 60 mole percent of the combination of $ZrF_4$ and the Hf.

The rare earth dopant can be one or more rare earth fluoride, preferably selected from the group Pr, Nd, Sm, Eu, Gd, Tb, Dy, Ho, Er, Tm, and Yb. The amount (Z in mole percent) of the rare earth dopant can be as follows: $Z \leq 3$, or preferably $Z \leq 5$, or even more preferably $Z \leq 10$, provided that the rare earth is Er. An alternative is to have at least some of the rare earth dopant(s) substituted at the expense of the La in the above formula. That is, there is 1 to 5 mole percent of a combination of at least one rare earth dopant and the $LaF_3$; even more preferably, wherein the combination is about 4.5%.

To make an optical fiber according to the present invention, a method comprising the following steps can be used: (1) make a first melt for a glass having a composition as specified above; (2) make a second melt for a glass having a lower index of refraction than that of the glass of the first melt; (3) form a glass preform or rod-in-tube assembly which consist of an inner portion made from the first melt and an outer portion made from the second melt; and (4) draw a fiber from the preform, the fiber having a core made from the inner portion and a cladding made from the outer portion. After the step (4) of drawing a fiber, an additional step (5) of redrawing the fiber can be added. To redraw a fiber, the fiber is located within a tube and drawn a second time in accordance with the subsequently discussed rod-in-tube approach. This is done to increase the thickness of the cladding relative to the core diameter in the finished fiber.

As to the above-numbered steps (1) and (2), respective batches of anhydrous fluoride, certified optical grade, raw ingredients—the fluorides of zirconium, barium, lanthanum, aluminum, sodium, and thorium—are mixed. Preferably, the amounts of each are proportioned so that the resulting glass will have a Hruby factor of at least 0.9, preferably at least 1.0, and more preferably at least 1.4, and still better, at least 1.5. These Hruby factors are also desirable when adding dopant(s) to the ingredients. The mixed ingredients are then melted in a vitreous carbon crucible located in a sealed furnace containing a nitrogen atmosphere. The compositions can be melted in a reactive atmosphere processing furnace, for example, at about 975° C. for 15 minutes, and then at about 875° C. for a dwell of about 70 minutes. The melting and the subsequent discussed casting steps are carried out in a dry, inert atmosphere, for example, containing Argon gas, or Nitrogen obtained by evaporation from liquid $N_2$. Preferably, though, a mixture of $NF_3$ and nitrogen is added to the furnace for about 15 minutes in an amount sufficient to create a reactive atmosphere over the melted glass and to essentially remove residual hydroxyl and oxide species.

At least one, preferably both of the melts have compositions according to the above formula. For example, the first melt can have a composition of 50.0 (mole percent of the fluoride)% Zr, 20.0% Ba, 4.0% La, 3.0% Al, 20.0% Na, and 3.0% Th. This first portion has a crystallization temperature of about 390° C., a glass transition temperature of about 269° C., the difference being 121° C., and an index of refraction of about 1.500. The second melt can have a composition of 38.0 (mole percent of the fluoride)% Zr, 12.0% Hf, 20.0% Ba, 4.0% La, 3.0% Al, 20.0% Na, and 3.0% Th. This second portion has a crystallization temperature of about 388° C., a glass transition temperature of about 270° C., the difference being 118° C., and an index of refraction of about 1.492. At the draw temperature, the viscosities of the first and second melts are similar, except that the glass viscosity of the second glass (which is used as the cladding in the optical fiber) is slightly greater than that of the first. This is advantageous because the drawing process usually has the effect of heating the cladding glass somewhat more than the core glass.

As to the above-numbered step (3), to make a glass sample, among the approaches for making a single mode optical fiber of the present invention include (i) built-in casting, (ii) rotational casting, (iii) cast around rod, and (iv) rod-in-tube construct.

For build-in casting (i), separate melts for the core and cladding glasses are prepared and kept, heated at a temperature of about 900° C. for a period of about 2 hours. The melt for the cladding is poured into the mold preheated to the glass transition temperature. The glass adjacent to the mold then cools. Next, the mold is then turned upside down so the glass in the center of the mold runs out to create a tube. The glass for the core is then pored into the tube to form a preform. The preform is annealed at a temperature slightly below the transition temperature of the glass and then cooled to room temperature.

If desired, the preform is then located in a jacketting tube, for example, a Teflon-FEP tube or a tube made of a compatible material and preferably made to have a refractive index lower than that of the core. The jacketting tube can be made by built-in casting. Alternatively, a glass rod can be bored with an ultrasonic boring machine to form a tube having an inner dimension slightly larger than the outer dimension of the glass core rod. An interior surface of the tube is then polished to form the jacketting tube. The preform is inserted into the jacketting tube, and then drawn into a fiber.

Many techniques can be used to draw the fiber for drawing step (4) above, but the techniques are selected based on the particular compositions of the glass fibers to be made. Accordingly, drawing procedures are separately outlined.

One suitable technique for drawing an optical fiber with a jacketting tube made as indicated above is to heat the preform to a drawing temperature of about 370° C. Before drawing the fiber, a space between the preform and the jacketting tube is flushed with dry nitrogen to remove moisture. One end of the preform is heated and the space is closed. During the drawing, the atmosphere in the jacketting tube is kept at about 0.5 atm by evacuating it with a vacuum pump. The fiber is draw from the preform at a rate of about 10 meters/minute.

Rotational casting (ii) is another approach to forming step (3) in the above-mentioned method. In rotational casting, the melt for the cladding is poured into a mold that can be 1 cm in internal diameter and of practically any desired length, for example, 20 cm. The mold is rotated with a lathe at a speed greater than 2500 revolutions per minute, and preferably greater than 3000 revolutions per minute. The result is a concentric tube having a wall thickness that is a function of the amount of glass injected into the mold. The melt for the core glass is then added into the tube by pouring, or the tube is dipped into the melt for the core, and by a slight vacuum sucked into the cladding. The preform is then annealed and cooled, and the fiber is drawn in accordance with drawing to step (4).

If the fiber is made with the jacketting tube, it can be drawn as discussed above. If a fiber is made by any of the processes discussed herein but without a jacketting tube, the preform can be heated in a resistance ring furnace with a localized heat zone of about 7 mm long at a drawing temperature of about 315° C. The drawing speed can be about 25 meters/minute.

Casting a cladding around the core (iii) is another approach to forming step (3) of the above-referenced method. The first melt (for the core) is poured into a mold, such as a preheated, gold-coated brass, cylindrical mold. The glass in the mold is annealed at a temperature near the glass transition temperature for approximately one hour, and thereafter cooled slowly (for example, at a rate of 5°–10° C./min.) to room temperature to produce a rod. The rod can initially be 9 mm or less in diameter and 100 mm long. Then the rod is cut and polished to a 6 mm diameter or less. The rod is the centered in a hollow, cylindrical mold with a 9 mm or less inner diameter and a 120 mm length. The rod and mold are heated to the glass transition temperature. The second melt (for the cladding) is then poured into the space between the rod and the mold to form a preform. The preform is annealed and then slowly cooled to room temperature, for example, over a period of 72 hours. The preform is removed from the mold, and then the fiber is drawn from the preform by the techniques discussed herein with reference to step (4).

The rod-in-tube approach (iv) is still another means to accomplishing forming step (3) of the above-mentioned method. The first melt (for the core) is poured in a mold having, for example, a cylindrical internal diameter of 1.0 cm or less. The glass is annealed and cooled to form a rod of glass for the core. The rod is removed from the mold. The second melt (for the cladding) is poured in a mold and rotated as in the rotational casting (ii) approach described above. The mold can have a 1.5 cm or greater internal diameter After the tube is formed, it is annealed, cooled and removed from the mold.

To form the fiber in accordance with drawing step (4) of the above-mentioned method, the rod is located within the center of the tube to form a combination resembling a preform. The assembly of the core and cladding is heated, the end closed, and evacuated to fuse the two glasses, as mentioned above with reference to the jacketting tube. The combination can then be subjected to drawing by an approach discussed above, either with or without a jacketting tube.

As an additional illustration of drawing step (4), the combination or preform can be heated by means of a resistance furnace in an inert (e.q., helium) atmosphere. The fiber can be drawn at speeds that range from 10–25 meters/minute at a temperature of about 320° C., if there is no jacketting tube.

In all of the above approaches to drawing step (4), the drawing can be performed in a nitrogen atmosphere. However, it is believed that drawing the fiber in a helium atmosphere may be better for reducing crystallization.

Of the approaches to making a fiber outlined above, it has been observed that the rotational casting approach produces some mixing of the core and cladding glasses, a behavior not found, for example, in the rod-in-tube approach. Accordingly, although the rotational casting approach is considered to be within the scope of the present invention, it is not considered the most preferable embodiment of the invention.

What is claimed is:

1. An optical fiber having a glass core comprised of the fluorides of zirconium, barium, lanthanum, aluminum, sodium, and thorium, wherein the core has a Hruby factor of at least 0.9.

2. The optical glass fiber of claim 1, wherein the core has a Hruby factor of at least 1.0.

3. The optical glass fiber of claim 1, wherein the core has a Hruby factor of at least 1.4.

4. The optical glass fiber of claim 1, wherein the core has a Hruby factor of at least 1.5.

5. An optical fiber comprising:
a core having a composition comprised of:
48 to 60 mole percent $ZrF_4$;
15 to 25 mole percent $BaF_2$;
1 to 5 mole percent $LaF_3$;
1 to 5 mole percent $AlF_3$;
15 to 22 mole percent NaF; and
X mole percent $ThF_4$, wherein $X>0$; and
a cladding having an index of refraction lower than that of the core.

6. The optical fiber of claim 5, wherein X is within the range of $1<X<10$.

7. The optical fiber of claim 6, wherein X is within the range of $4 \leq X \leq 5$ and there is between 48 and 49 mole percent $ZrF_4$.

8. The optical fiber of claim 6, wherein the composition of the core is further comprised of at least one dopant, the additive having Y mole percent of a first additive + Z mole percent of rare earth dopant, wherein the amounts of these constituents satisfies the following three conditions: $0 \leq Y$, $0 \leq Z$, and $Y+Z>0$.

9. The optical fiber of claim 8, wherein the first additive is comprised of Hf, Pb, or Cl.

10. The optical fiber of claim 8, wherein the first additive is Pb and the composition has 15 to 25 mole percent of the combination of $BaF_2$ and Pb.

11. The optical fiber of claim 8, wherein the first additive is Hf and the composition has 48 to 60 mole percent of the combination of $ZrF_4$ and the Hf.

12. The optical fiber of claim 8, wherein the rare earth dopant is one or more rare earth fluoride from the group consisting of Pr, Nd, Sm, Eu, Gd, Tb, Dy, Ho, Er, Tm and Yb.

13. The optical fiber of claim 12, wherein $Z \leq 3$.

14. The optical fiber of claim 12, wherein $Z \leq 5.1$

15. The optical fiber of claim 12, wherein $Z \leq 10$ and the rare earth is Er.

16. The optical fiber of claim 12, wherein the composition has 1 to 5 mole percent of a combination of at least one rare earth dopant and $LaF_3$.

* * * * *